United States Patent

Schäublin et al.

Patent Number: 5,192,061
Date of Patent: Mar. 9, 1993

[54] CLAMP ELEMENT, INCLUDING A RAPID FEED DEVICE COMBINED WITH A FORCE AMPLIFIER

[75] Inventors: Thomas Schäublin, Münchwilen; Heinrich Berchtold, Nänikon/Uster, both of Switzerland

[73] Assignee: Gressel AG, Aadorf, Switzerland

[21] Appl. No.: 865,064

[22] Filed: Apr. 8, 1992

[30] Foreign Application Priority Data

Apr. 17, 1991 [DE] Fed. Rep. of Germany ....... 4112512

[51] Int. Cl.$^5$ .............................................. B25B 1/14
[52] U.S. Cl. .................................................. 269/228
[58] Field of Search .................... 74/110, 516; 269/32, 269/228, 244, 246

[56] References Cited

U.S. PATENT DOCUMENTS

| | | | |
|---|---|---|---|
| 3,650,522 | 3/1972 | Wermuth et al. | 269/228 |
| 3,807,721 | 4/1974 | Arnold | 269/228 |
| 3,902,707 | 9/1975 | Preisenhammer | 269/228 |
| 3,941,362 | 3/1976 | Arnold et al. | 269/228 |
| 4,270,398 | 6/1981 | Arnold | 269/32 |

Primary Examiner—Robert C. Watson
Attorney, Agent, or Firm—Flynn, Thiel, Boutell & Tanis

[57] ABSTRACT

The clamp element includes a rapid feed device combined with a force amplifier. The force amplifier is surrounded by a rotatable feed sleeve, which engages through an external thread in a female thread of a surrounding housing. A first tightening member is fixed and a tightening clamp member is rotatably arranged in the feed sleeve. Two tightening pins are arranged between the two tightening members. The tightening pins are supported on the second tightening member the smallest possible distance from the feed sleeve axis. An actuating and tensioning rod is passed either through a central aperture in the first tightening member (FIGS. 7-11) or through two diametrically opposite, lateral aperture of the first tightening member (FIGS. 1-6). The latter apertures are sufficiently large in the peripheral direction of the feed sleeve to allow a limited rotation of the actuating and tensioning rod relative to the feed sleeve sufficient for the rotation of the second tightening member relative to the first tightening member. On turning the actuating and tensioning rod in the tightening sense, this is first drawn axially into the housing by rotation of the feed sleeve.

11 Claims, 4 Drawing Sheets

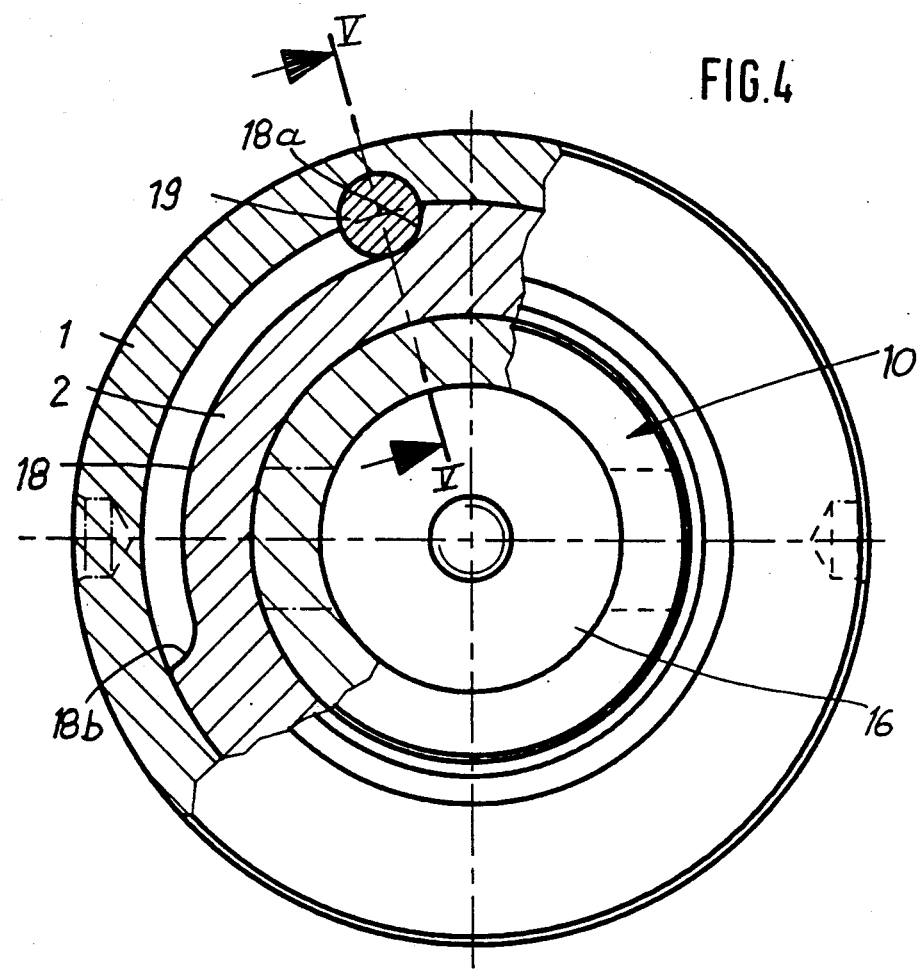
FIG.4
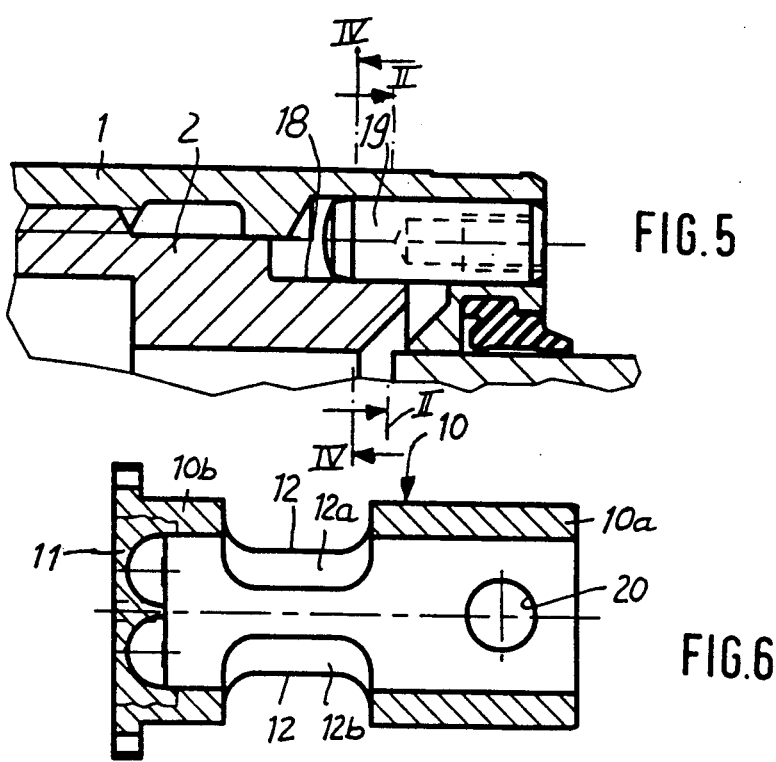
FIG.5
FIG.6

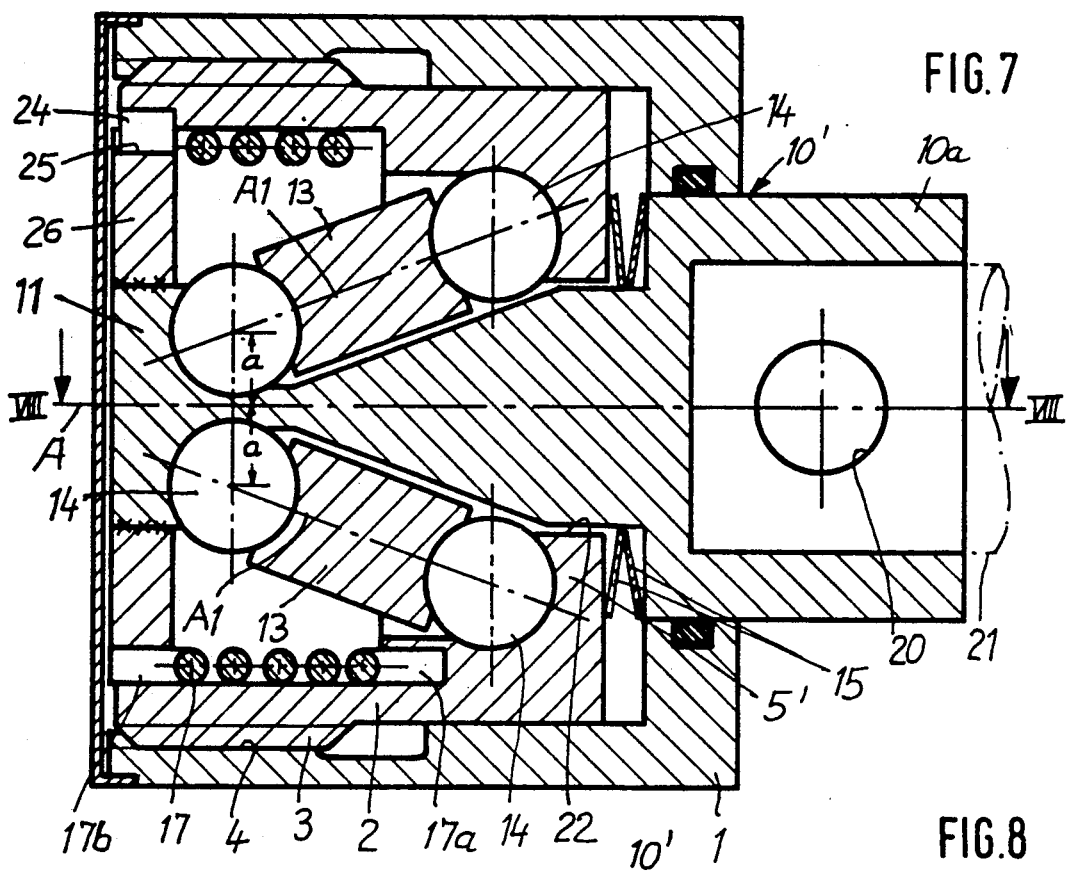
FIG. 7
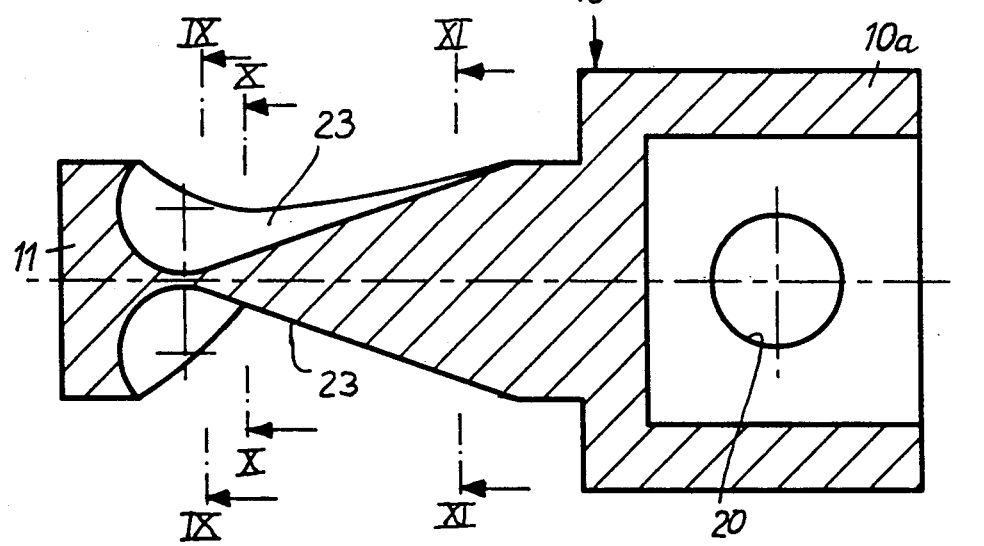
FIG. 8
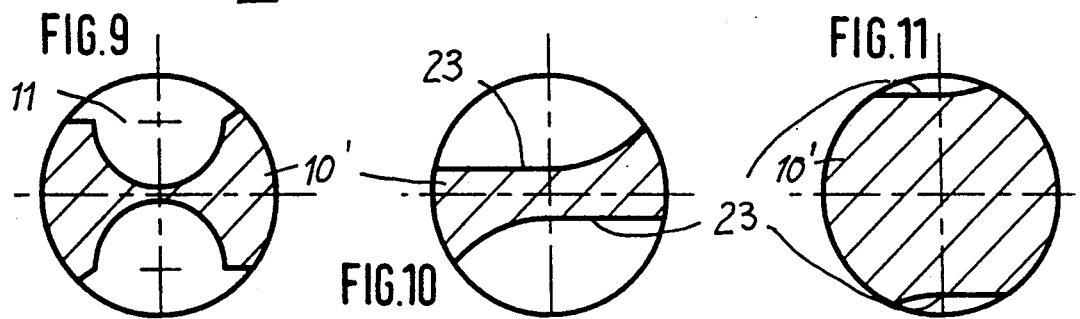
FIG. 9
FIG. 10
FIG. 11

CLAMP ELEMENT, INCLUDING A RAPID FEED DEVICE COMBINED WITH A FORCE AMPLIFIER

FIELD OF THE INVENTION

This invention relates to a clamp element, including a rapid feed device combined with a force amplifier, with a rotatable feed sleeve surrounding the force amplifier and having an external thread engaging in a female thread of a housing surrounding the same, the rotational movement of the sleeve relative to the housing being restricted by stop surfaces, a first tightening member fixedly arranged in the feed sleeve, a second tightening member arranged for limited rotation in the feed sleeve, a plurality of tightening pins arranged between the tightening members, which pins are inclined at an acute angle to a plane running through the feed sleeve axis in one end position (relaxed position) of the second tightening member and are arranged approximately parallel to this plane in the other end position (clamping position) of the second tightening member, a compression spring biasing the two tightening members towards one another, and an actuating and tensioning rod extending through at least one aperture of the first tightening member and connected fast rotationally and in tension to the second tightening member, such that, on rotation of the actuating and tensioning rod in its tightening sense it is drawn axially into the housing in a feed stroke and a following tightening stroke, firstly by rotation of the feed sleeve relative to the housing and them by rotation of the second tightening member relative to the first, with consequent righting of the tightening pins into the clamping position parallel to the plane.

BACKGROUND OF THE INVENTION

In such a clamp element (cf. the prior German patent 4 018 284, corresponding to U.S. application Ser. No. 07/706,797, filed May 29, 1991 the tensioning rod is passed centrally through both the first tightening member and the second tightening member and is connected to this by a transverse pin. The tightening pins are supported radially outside the tensioning rod on the clamp members. By rotating the second tightening member relative to the first tightening member by means of the actuating and tensioning rod, the tightening pins are righted from their inclined position relative to the feed sleeve axis, i.e. they are brought into a clamping position parallel or approximately parallel to the feed sleeve axis. Since the clamping force is greatly increased by this, a correspondingly large torque is needed to turn the actuating and tensioning rod about its axis. With smaller machine vices or rapid clamping devices, for which clamp elements of the type defined are mainly used, the torque needed on tightening to turn the actuating and tensioning rod lies in a range which permits the use of a manual lever to turn the actuating and tensioning rod. For larger machine vices and clamp devices with a clamping force of 40 kN however, the torque needed to turn the actuating and tensioning rod is so large that manual force no longer suffices or the actuating lever becomes so long that it collides with parts in the vicinity of the clamp device. It should be noted that, in the clamp element of the type defined, the rotation of the actuating and tensioning rod needed for both the feed stroke and the tightening stroke should be as much less than 180° as possible.

SUMMARY OF THE INVENTION

The invention is therefore based, on the problem of providing a clamp element, including a rapid feed device combined with a force amplifier, of the kind initially referred to, in which the torque needed to rotate the actuating and tensioning rod is as small as possible, in order to facilitate simple and comfortable manual operation.

This is achieved by the invention in that the tightening pins are supported on the second tightening member at the smallest possible distance from the feed sleeve axis and in that the actuating and tensioning rod is passed either through a central aperture in the first tightening member or through two diametrically opposite lateral apertures of the first tightening member, where the last-mentioned apertures are sufficiently large in the peripheral direction of the feed sleeve to allow a limited rotation of the actuating and tensioning rod relative to the feed sleeve sufficient for the rotation of the second clamp member relative to the first tightening member.

In the novel clamp element the tightening pins are therefore arranged on the second tightening member, on which the actuating and tensioning rod acts directly, as close as possible to the feed sleeve axis, which is at the same time the central axis of the clamp element. Through this the torque needed to rotate the actuating and tensioning rod in the actual tightening stroke is substantially reduced, since the lever arm between the central axis and the support of the tightening pins on the second tightening member is relatively small. The reduced torque has the advantage that, even with clamping forces of 40 kN and more, manual force is sufficient for the operation and the length of the manual lever stays within acceptable bounds. Also, in the novel clamp element, only a rotation of the actuating and tensioning rod of less than 180° is needed to carry out its feed stroke and tightening stroke.

BRIEF DESCRIPTION OF THE DRAWINGS

The invention will be explained in more detail with refererice to the embodiments shown in the drawings. These show.

DETAILED DESCRIPTION

Figure 1:
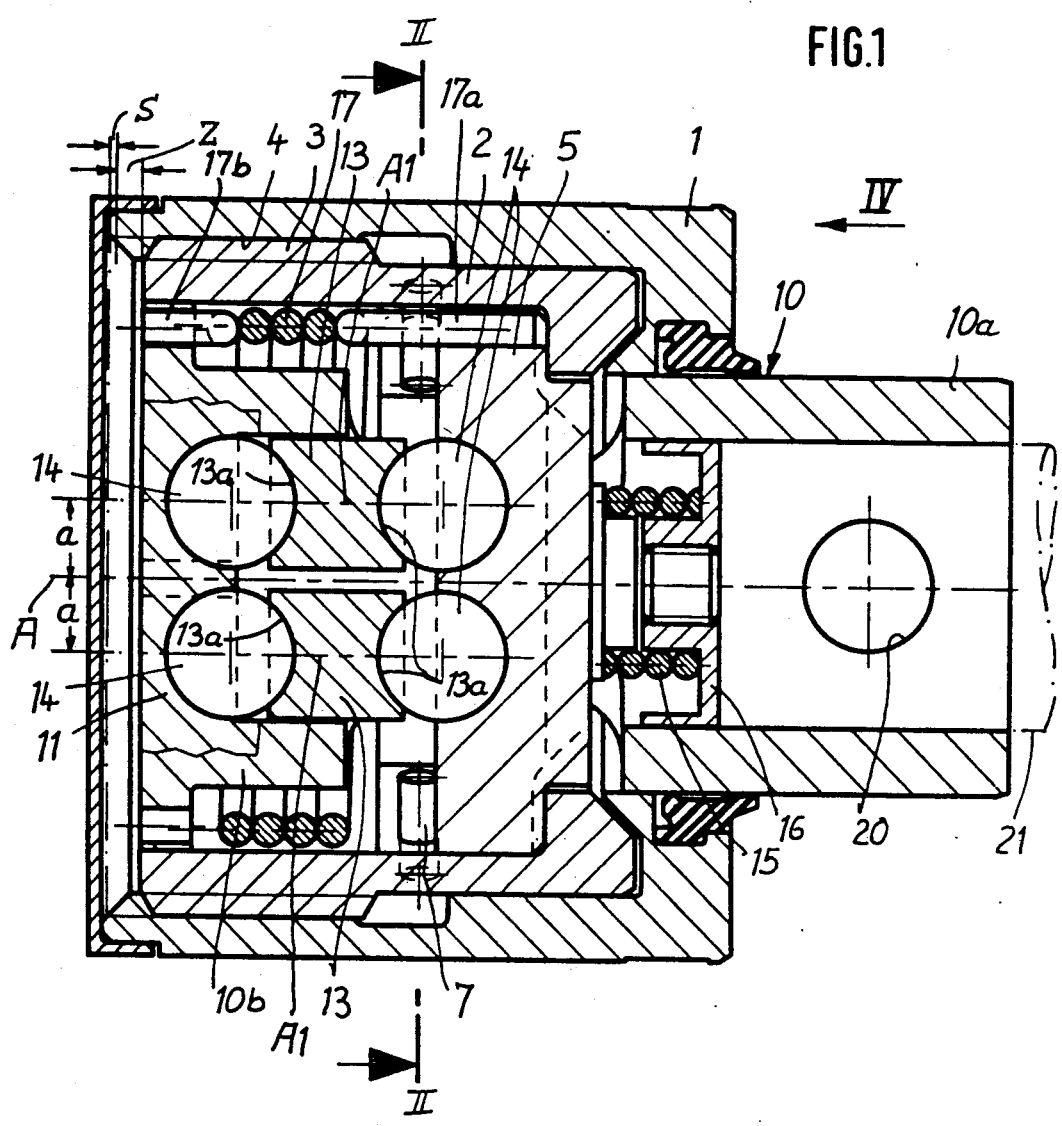
FIG. 1 an axial section of a first embodiment according to the line I—I of FIG. 2, FIG. 2 a radial section of the clamp element in relaxed state according to the line II—II of FIG. 1 and partially according to the line II—II of FIG. 5, FIG. 3 the same radial section in the tightened state, FIG. 4 an end view of the clamp element in the direction IV, partially in section according to the line IV—IV in FIG. 5, FIG. 5 a partial section according to the line V—V of FIG. 4, FIG. 6 an axial section of the hollow tensioning rod, FIG. 7 an axial section of a second embodiment, FIG. 8 an axial section of the tensioning rod, FIGS. 9, 10 and 11 cross-sections of the tensioning rod according to the lines IX—IX, X—X and XI—XI of FIG. 8.

The clamp element comprises a housing 1 which can be fitted in the body of a machine vice or a rapid clamp device for example and is fixed there fast against rotation and axially immovable. Within the housing 1 a feed sleeve 2 is mounted for limited rotation. The feed sleeve 2 has an external thread 3, which engates in a corresponding female thread 4 of the housing 1. Both threads 3, 4 are advantageously formed as coarse (steep) threads. In the illustrated embodiment the external thread 3 is a trapezoidal thread Tr 52×10 (mm), i.e. it has a pitch or lead of 10 mm with a nominal diameter of 52 mm. Since the pitch of the external thread 3 is essential to the feed or opening stroke obtainable with a given angle of rotation of a manual lever, not shown, and since the external thread must always be self-holding, the pitch cannot be arbitrarily increased.

A first tightening member 5 is arranged within the feed sleeve 2, fast against rotation and axially immovable relative to the feed sleeve 2. To this end the tightening member 5, formed like a bridge, engages with its diametrically opposite ends in semi-circular recesses 6 in the feed sleeve 2, as is apparent from FIG. 3, whereby the rotationally fast connection is made; moreover it is fixed axially by the fixing pins 7. By virtue of the bridge-like form of the first tightening member 5, two diametrically opposite apertures 9 are formed between its two side bounding surfaces 8 and the feed sleeve 2. An actuating and tensioning rod 10 is passed through these apertures 9, being made hollow in the embodiment shown in FIGS. 1-6. The one end 10a of this hollow actuating and tensioning rod 10 is extended out of the housing 1 while the other end 10b arranged within the housing is connected to the second tightening member 11, fast against rotation and in tension. The second member 11 is advantageously unitary with the hollow actuating and tensioning rod 10 in the illustrated embodiment and forms the bottom thereof. In the region of the bridge-like first tightening member 5, two diametrically opposite cut-outs 12 are provided in the wall of the hollow actuating and tensioning rod 10 and are sufficiently large in the peripheral direction for the actuating and tensioning rod 10 to be rotatable relative to the feed sleeve 2 through at least 30°. In the illustrated embodiment the freedom to rotate amounts to about 60°.

In between the two tightening members 5, 11 two tightening pins 13 are provided, being arranged on the two sides of the feed sleeve axis or central axis A of the clamp element, diametrically opposite one another. The tightening pins 13 each have a spherical cup 13a at their two ends and balls 14 are arranged in the two tightening members 5, 11, the tightening pins 13 bearing with their spherical cups 13a on these balls. It is important that at least the balls 14 on the second tightening member 11 are arranged at the smallest possible distance a from the feed sleeve axis A, whereby the support of the tightening pins 13 is made as close as possible to the feed sleeve axis A. Through this it is ensured that the torque needed to rotate the actuating and tensioning rod 10 relative to the feed sleeve 2 in the tightening stroke is kept small. If desired, the tightening pins 13 could also be made hemispherical at their ends, the balls 14 then being dispensed with.

In FIG. 1 the clamp element is shown in its starting position, i.e. in the relaxed position. In this the second tightening member 11 with its balls 14 is rotated by about 52° in the peripheral direction. The tightening pins 13 are accordingly crossed or arranged inclined at an acute angle to the feed sleeve axis A. The tightening pins 13 are shown in the position parallel to the feed sleeve axis A in FIG. 1, which they assume in the tightened position, solely for ease of understanding.

In the actuating and tensioning rod 10 there is further arranged a compression spring 15, which abuts a pressed in cap 16 and presses on the first tightening member 5. The tightening members 5, 11 are thus pressed towards each other. Furthermore a torsion spring 17 is provided with its ends 17a, 17b engaging one in each of the tightening members 5, 11. This torsion spring 17 ensures, together with the stops described in more detail below, that the two tightening members 5, 11 are located in a precisely defined rotated position in the starting or relaxed position. This position corresponds to FIG. 2.

Figure 2:
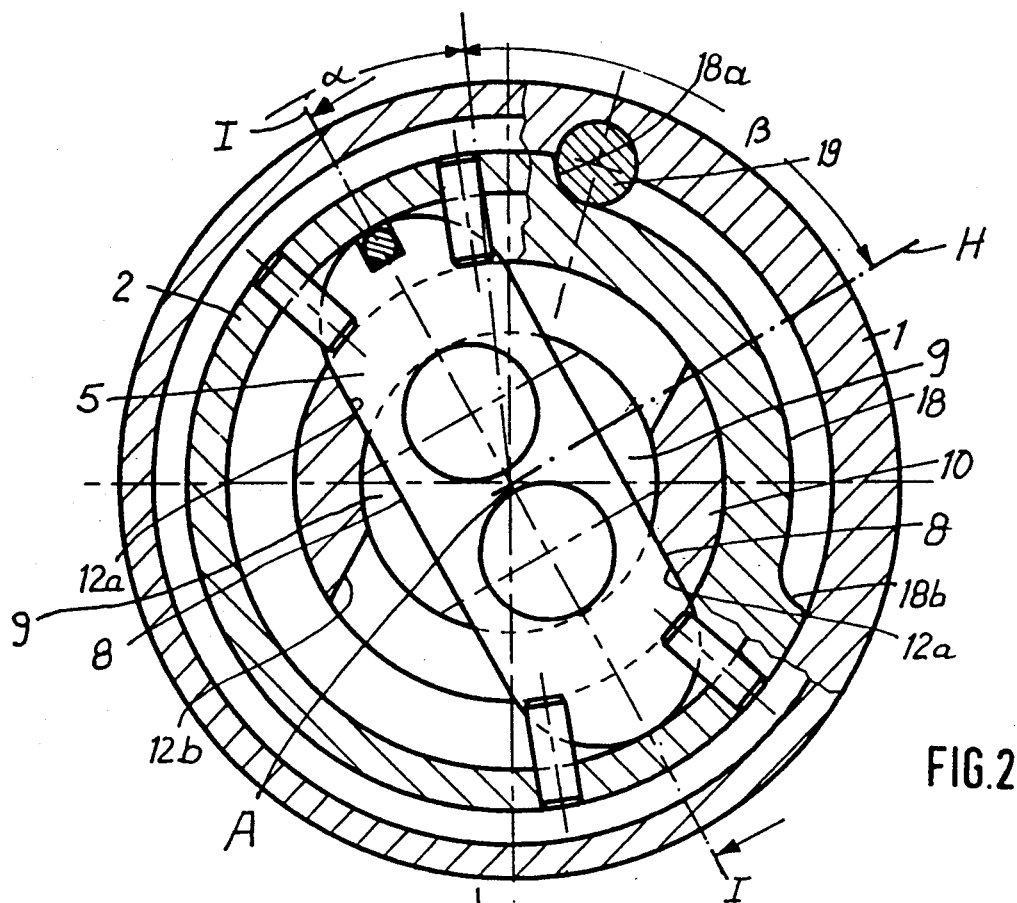

As is apparent from FIG. 6, the cut-outs 12 have axially extending bounding surfaces 12a, 12b, which are provided as stop surfaces to limit the mutual rotation of the two tightening members 5, 11 and cooperate with the side bounding surfaces 8 of the first tightening member 5. In the relaxed state, which is shown in FIG. 2, the torsion spring 17 holds the bounding surfaces 12a in abutment with the bounding surfaces 8.

Furthermore the feed sleeve 2 has a groove 18 extending in the peripheral direction, over an angle of about 90°, whose ends 18a, 18b cooperate with a stop pin 19, which is fixed in the housing 1.

The end 10a of the actuating and tensioning rod 10 projecting out of the housing 1 can be connected by a coupling pin, not shown, which engages in a transverse bore 20, to the drive spindle 21 of a machine vice or a rapid clamping device, not shown, where the drive spindle itself represents an actuating and tensioning rod which acts on a movable jaw, similar to what is shown in German patent 4 018 284. The actuating and tensioning rod 10 thus has two functions in the clamp element according to the invention. It serves to rotate the feed sleeve 2 in the housing 1 and for the mutual rotation of the tightening members 5, 11, i.e. for actuation of the clamp element. Moreover it serves to transmit the clamping force generated by the clamp element to a clamp device.

Figure 3:
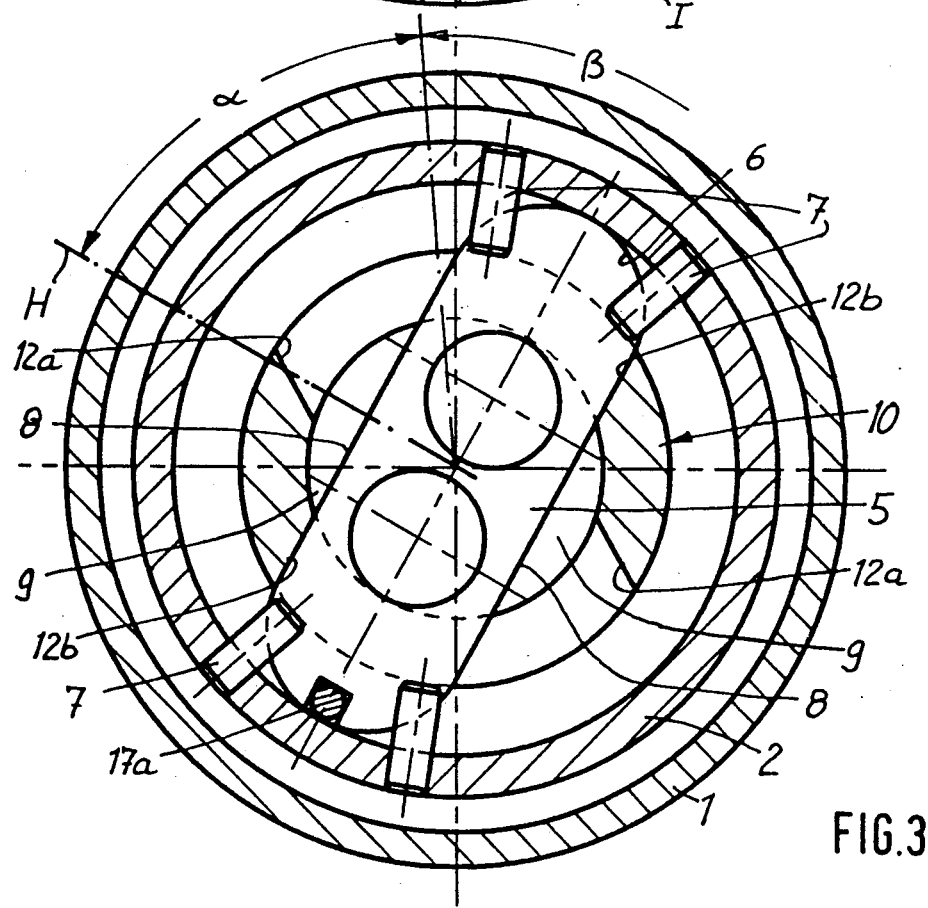

The manner of operation is as follows:

By means of a manual lever engaging the drive spindle 21, and whose position is indicated at H in each of FIGS. 2 and 3, the drive spindle 21 and accordingly the actuating and tensioning rod 10 also can be rotated. In the relaxed position of the clamp element the feed sleeve 2 is rotated so far to the right relative to the housing 1, in accordance with FIG. 2, that the stop surface 18a bears on the stop pin 19. Moreover the second tightening member 11 is rotated so far to the right that the bounding surfaces 12a of the actuating and tensioning rod 10 connected fast to the second member 11 bear on the bounding surfaces 8 of the first member 5. By swinging the manual lever H counterclockwise according to FIG. 2, to the left, the actuating and tensioning rod 10 and accordingly the second tightening member 11 are rotated. Under the action of the compression spring 15 as well as the torsion spring 17, the tightening pins 13 initially stay in their crossed position, skewed relative to the feed sleeve axis A. During the initial rotation of the second tightening member 11, the first tightening member 5 is accordingly entrained in the same direction of rotation. Since this member is rotationally fast with the feed sleeve 2, the feed sleeve 2 is initially rotated in the same direction of rotation also. Through the cooperation of the external thread 3 with the female thread 4, the feed sleeve 2 moves through a feed stroke A to the left according to FIG. 1, which can amount to 2.5 mm maximum in the illustrated embodiment. Through the first tightening member 5 and the tightening pins 13 the second tightening member 11 also is moved to the left and carries the actuating and tensioning rod 10 with it, the latter being moved into the housing 1 by the amount of the feed stroke Z. Through this a movable jaw of a machine vice or a rapid clamping device for example is moved up to a workpiece and brought into abutment. In order to attain the maximum feed stroke Z of 2.5 mm, the manual lever H has to be swung through an angle $\beta$ of 90°.

As soon as the movable jaw abuts the workpiece, the torque increases and further rotation of the feed sleeve 2 is blocked by the threads 3, 4. Accordingly the first tightening member 5 can also not turn any further. The actual tightening stroke now follows. Through further rotation of the second tightening member 11 to the left according to FIG. 2, the tightening pins 13 are righted, i.e. their degree of crossing or their acute angle relative to the feed sleeve axis A decreases. Through this righting of the tightening pins 13 the distance between the two tightening members 5, 11 increased. The rotation of the second tightening member 11 is continued until the axes A1 of the tightening pins 13 are inclined past their dead center by about 3° relative to the feed sleeve axis A, in the opposite direction to their starting position. By means of the movement of the tightening pins 13 beyond their parallel position to the feed sleeve axis A, i.e. beyond their dead center, reliable locking of the force amplifier is obtained. In order to reach this tightened position, the manual lever H is swung through the angle $\alpha$, 58° in the illustrated embodiment. Through this the actuating and tensioning rod 10 reaches the position shown in FIG. 3, in which further rotation is prevented by abutment of the bounding surfaces 12b on the side bounding surfaces 8 of the tightening member 5. Through the increase in the distance between the two tightening members 5, 11, the second tightening member 11 is displaced further to the left through the tightening stroke S of about 1 mm and also draws the actuating and tensioning rod 10 into the housing 1 by the same amount. Through this the actuating and tensioning rod 10 exerts the desired high clamping force on the drive spindle 21, which for example draws a movable jaw in the direction of the housing 1. While the angle of rotation $\alpha$ which the manual lever H executes during the tightening stroke S, is always the same, the angle of rotation $\beta$ during the feed stroke depends on how far the movable jaw has to be moved to bear on the workpiece. If the play between the open jaw and the workpiece is less that the maximum feed stroke Z, the angle of rotation $\beta$ is also less than 90°.

Release follows in the reverse sequence, in that the manual lever H is swung in the opposite direction of rotation to the right according to FIG. 3. Through this the actuating and tensioning rod 10 with the second tightening member 11 also turn to the right, until the bounding surfaces 12a again come into abutment with the side bounding surfaces 8 of the first tightening member 5. Through this it is ensured that the tightening pins 13 are also brought into their original inclined position. The compression spring 15 holds the second clamp member 11 with its balls 14 in constant contact with the tightening pins 13 and also has the effect that the actuating and tensioning rod 10 is moved to the right into the relaxed position. As soon as the bounding surfaces 12a bear on the first tightening member 5, the feed sleeve 2 is turned clockwise according to FIG. 2, until its stop surface 18a comes into abutment again with the stop pin 19. The manual lever H thus takes up its position shown in FIG. 2 by a chain-dotted line. Through the rotation of the feed sleeve 2 relative to the housing 1, the actuating and tensioning rod 10 moves further to the right according to FIG. 1, until it has reached its initial or relaxed position again. A movable jaw is thus moved completely into its open position again.

ALTERNATE EMBODIMENT (FIGS. 7-11)

The embodiment of the clamp element shown in FIGS. 7 to 11 differs from that previously described essentially only in the form of the actuating and tensioning rod 10' and the first tightening member 5'. The same references are therefore used for the other parts of the clamp element as in the previously described embodiment and the above description applies in essence thereto. In contrast to FIG. 1, FIG. 7 shows the clamp element in the tightened position.

In the embodiment shown in FIGS. 7 to 11 the actuating and tensioning rod is passed through a central aperture 22 in the first tightening member 5'. The first tightening member 5' is formed by the bottom of the feed sleeve 2 but it can also be a separate part fitted in the feed sleeve and fixed therein. The tightening pins 13 or their balls 14 are supported radially outside the actuating and tensioning rod 10' on the first tightening member 5'. The second tightening member 11 is in one piece with the actuating and tensioning rod 10', the balls 14 being arranged on the second tightening member 11 as close as possible to the feed sleeve axis A. This results in the tightening pins 13 being supported as small a distance a as possible from the feed sleeve axis A and the torque needed to rotate the actuating and tensioning rod 10' is kept small.

The precise form of the actuating and tensioning rod 10' can be seen from FIGS. 8 to 11. It is provided in the region of the tightening pins 13 with two diametrically opposite recesses 23, which approach each other towards the second tightening member 11, as is apparent from FIG. 8. Accordingly the actuating and tensioning rod 10' is wedge-shaped in axial section in the region of the tightening pins. In order to achieve the smallest possible weakening of the actuating and tensioning rod 10' in the region of the tightening pins 13, the recesses 23 should only be large enough on the one hand to permit unimpeded movement of the tightening pins 13 and on the other hand for the actuating and tensioning rod 10' to have the largest possible residual cross-section in the region of the recesses 23. The form of the recesses 23 in detail and what residual cross-section remains are apparent from FIGS. 9 to 11. The recesses 23 must be laterally open at the diametrically opposite sides, so that space is provided for the tightening pins 13 crossed by mutual rotation of the tightening members 5', 11.

The manner of operation of the clamp element shown in FIGS. 7 to 11 corresponds to the manner of operation of the embodiment shown in FIGS. 1 to 6, so that reiterated description is superfluous. In the embodiment shown in FIGS. 7 to 11 however, the rotational movement between the second tightening member 11 and the feed sleeve 2 is limited by a stop pin 24 fitted in the feed sleeve 2 and which engages in a groove 25 extending over a predetermined angle in the disc 26 connected fast to the second tightening member 11, similar to what is shown and described in German patent 4 018 284. This way of limiting the rotation between the second tightening member 11 and the feed sleeve 2 corresponds to the way of limiting the rotation between the feed sleeve 2 and the housing 1 in the first embodiment. The same limiting of rotation is also provided in the second embodiment between the feed sleeve 2 and the housing 1. As can furthermore be seen from FIG. 7, which represents the tightened position, the axes A1 are not parallel to the feed sleeve axis A in the tightened position. However they are parallel or substantially parallel to a plane through the feed sleeve axis A, which coincides with the plane of the drawing.

In order that the clamp element shall be as compact as possible and usable in the most varied clamp devices, it is advantageous if the actuating and tensioning rod 10, 10′ ends close to where it emerges from the housing 1 and has a coupling on its end 10a projecting out of the housing 1, by means of which it can be connected fast rotationally and in tension to a drive spindle of a clamp device, especially the drive spindle of a machine vice or a rapid clamp device. Advantageously the end 10a projecting out of the housing 1 is made hollow, as is the case in both the embodiments, and has a transverse bore 20 for a coupling pin also passing through the drive spindle 21. This coupling pin engages in the transverse bore 20.

In machine vices, this formation in which the actuating and tensioning rod 10, 10′ ends close to the housing 1, has the advantage that the drive spindle can very easily be released from the clamping element by withdrawing the coupling pin. The drive spindle and a slide carrying the movable jaw can then easily be withdrawn from the body of the machine vice. Bores which are provided in the body below the drive spindle are thereby freely accessible. Screws can be passed through these bores and can be screwed into grooved blocks of the clamping table of a machine tool. Through these screws the machine vice can be fixed easily on the clamping table, without use of clamping dogs. Through these screws the body is clamped fast to the clamping table below the drive spindle and the slide, whereby deformation of the body by the clamping force of the clamp element is counteracted. The coupling location of the tensioning rod in the neighborhood of its exit from the housing of the clamp element is not only advantageous in the clamp element according to the invention but also with those of other construction, since in each case it facilitates rapid coupling and uncoupling of the drive spindle and complete withdrawal of the slide as well as the drive spindle itself. In this way rapid access to the fixing screws for the body is ensured.

Precision bolts can be used as fixing screws, facilitating precise positioning of the machine vice on so-called grid plates. Moreover the fixing of the machine vice with fixing screws, which are passed through the body below the screw spindle in the described manner, has the advantage that a plurality of machine vices can be arranged close to one another in space saving manner.

The embodiments of the invention in which an exclusive property or privilege is claimed are defined as follows:

1. A clamp element, including a rapid feed device combined with a force amplifier, having a rotatable feed sleeve surrounding the force amplifier and having an external thread engaging in a female thread of a housing surrounding the feed sleeve, the rotational movement of the sleeve relative to the housing being restricted by stop surfaces, a first tightening member fixedly arranged in the feed sleeve, a second tightening member arranged for limited rotation in the feed sleeve, a plurality of tightening pins arranged between the tightening members, which pins are inclined at an acute angle to a plane running through the feed sleeve axis in a relaxed position of the second tightening member and are arranged approximately parallel to this plane in the clamping position of the second tightening member, a compression spring biasing the two tightening members towards one another, and an actuating and tensioning rod extending through at least one aperture of the first tightening member and connected fast rotationally and in tension to the second tightening member, such that, on rotation of the actuating and tensioning rod in its tightening sense it is drawn axially into the housing in a feed stroke and a following tightening stroke, firstly by rotation of the feed sleeve relative to the housing and then by rotation of the second tightening member relative to the first tightening member, with consequent moving of the tightening pins into the clamping position parallel to the plane, wherein the tightening pins are supported on the second tightening member at the smallest possible distance from the feed sleeve axis, and wherein the actuating and tensioning rod is hollow and is passed through two diametrically opposite axial apertures provided between the first tightening member and the feed sleeve, the apertures being sufficiently large in the peripheral direction of the feed sleeve to allow a limited rotation of the actuating and tensioning rod relative to the feed sleeve sufficient for the rotation of the second tightening member relative to the first tightening member.

2. The clamp element according to claim 1, wherein, with the actuating and tensing rod passed through the central aperture of the first tightening member, the tightening pins are supported on the first tightening member radically outside the actuating and tensing rod, wherein the second tightening member is unitary wit the actuating and tensing rod, wherein a tightening pin is provided on each of two diametrically opposite sides of the actuating and tensioning rod and wherein the actuating and tensioning rod is provided in the region of the tightening pins with two diametrically opposite recesses being provided therefor, which recesses approach each other towards the second tightening member and are made only large enough on the one hand to allow an unimpeded, limited movement of the tightening pins and on the other hand to give the actuating and tensioning rod as large as possible a residual cross-section in the region of the recesses.

3. The clamp element according to claim 1, wherein the first tightening member is bridge-like and is fixed to one end of the feed sleeve, and wherein the actuating and tensioning rod is hollow and its wall is provided with diametrically opposite cut-outs in the region of the first tightening member, the cut-outs being large enough in the peripheral direction for the actuating and tensioning rod to be rotatable relative to the feed sleeve through at least 30°.

4. The clamp element according to claim 3, wherein the cut-outs have axially extending bounding surfaces, which are provided as stop surfaces for limiting the mutual rotation of the first and second tightening members and cooperate with side bounding surfaces of the first tightening member.

5. The clamp element according to claim 1, wherein each tightening pin has spherical cups at both ends and wherein balls are arranged in the first and second tightening members, on which balls the tightening pins abut with their spherical cups.

6. The clamp element especially according to claim 1, wherein a longitudinal length of the actuating and tensioning rod terminates an end located adjacent where it emerges from the housing and has a coupling the end projecting from the housing, through which coupling it can be connected fast rotationally and in tension to a drive spindle of a machine vice.

7. The clamp element according to claim 6, wherein the end projecting from the housing is hollow and wherein the coupling is a cross bore adapted to receive a coupling pin extending also through the drive spindle.

8. A clamp element, including a rapid feed device combined with a force amplifier, having a rotatable feed sleeve surrounding the force amplifier and having an external thread engaging in a female thread of a housing surrounding the feed sleeve, the rotational movement of the sleeve relative to the housing being restricted by stop surfaces, a first tightening member fixedly arranged in the feed sleeve, a second tightening member arranged for limited rotation in the feed sleeve, a plurality of tightening pins arranged between the tightening members, which pins are inclined at an acute angle to a plane running through the feed sleeve axis in a relaxed position of the second tightening member and are arranged approximately parallel to this plane in the clamping position of the second tightening member, a compression spring biasing the two tightening members towards one another, and an actuating and tensioning rod extending through at least one aperture of the first tightening member and connected fast rotationally and in tension to the second tightening member, such that, on rotation of the actuating and tensioning rod in its tightening sense it is drawn axially into the housing in a feed stroke and a following tightening stroke, firstly by rotation of the feed sleeve relative to the housing and then by rotation of the second tightening member relative to the first tightening member, with consequent moving of the tightening pins into the clamping position parallel to the plane, wherein the tightening pins are supported on the second tightening member at the smallest possible distance from the feed sleeve axis, and in that the actuating and tensioning rod is passed through a central aperture in the first tightening member.

9. The clamp element according to claim 8, wherein each tightening pin has spherical cups at both ends and wherein balls are arranged in the first and second tightening members, on which balls the tightening pins abut with their spherical cups.

10. The clamp element especially according to claim 8, wherein a longitudinal length of the actuating and tensioning rod terminates an end located adjacent where it emerges from the housing and has a coupling the end projecting from the housing, through which coupling it can be connected fast rotationally and in tension to a drive spindle of a machine vice.

11. The clamp element according to claim 8, wherein the end projecting from the housing is hollow and wherein the coupling is a cross bore adapted to receive a coupling pin extending also through the drive spindle.

* * * * *